(12) United States Patent
Mergel et al.

(10) Patent No.: US 7,964,322 B2
(45) Date of Patent: Jun. 21, 2011

(54) SEPARATOR FOR DIRECT METHANOL FUEL CELL

(75) Inventors: Stefan Mergel, Berlin (DE); Diego Larrain, Berlin (DE); Matthias Bronold, Berlin (DE)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 60 days.

(21) Appl. No.: 12/026,401

(22) Filed: Feb. 5, 2008

(65) Prior Publication Data

US 2008/0187810 A1    Aug. 7, 2008

(30) Foreign Application Priority Data

Feb. 6, 2007 (EP) ..................................... 07101794
Jan. 29, 2008 (KR) ........................ 10-2008-0009021

(51) Int. Cl.
*H01M 2/14* (2006.01)
(52) U.S. Cl. ............. 429/514; 429/17; 429/34; 429/247
(58) Field of Classification Search .................... 429/17, 429/34, 247, 514; 96/4, 6
See application file for complete search history.

(56) References Cited

U.S. PATENT DOCUMENTS

| | | | |
|---|---|---|---|
| 4,110,220 A | 8/1978 | Lavender | |
| 4,988,583 A * | 1/1991 | Watkins et al. | 429/30 |
| 2002/0192525 A1* | 12/2002 | Neutzler | 429/34 |
| 2003/0157395 A1 | 8/2003 | Xiaoming et al. | |

FOREIGN PATENT DOCUMENTS

| | | | |
|---|---|---|---|
| GB | 2100859 A | | 1/1983 |
| JP | 2005216580 A | * | 8/2005 |
| KR | 10-2006-0065776 | * | 6/2006 |
| KR | 10-2006-0024967 | * | 9/2006 |
| KR | 10-2006-0101393 A | | 9/2006 |
| KR | 10-2007-0037207 | * | 4/2007 |

OTHER PUBLICATIONS

Korean Office Action issued Oct. 29, 2009 in Korean Patent Application No. 10-2008-0009021.
Korean Office Action issued Apr. 26, 2010 in Korean Patent Application No. 10-2008-0009021.
EPO Search Report dated Sep. 3, 2007 in related EP Application No. 07101794.1.
Registration Determination Certificate dated Oct. 26, 2010 in related Korean Patent Application No. 10-2008-0009021.

* cited by examiner

*Primary Examiner* — Jennifer K Michener
*Assistant Examiner* — Carlos Barcena
(74) *Attorney, Agent, or Firm* — Knobbe, Martens, Olson & Bear LLP

(57) ABSTRACT

A separator for separating a gas/liquid mixture for a direct methanol fuel cell (DMFC) comprises a closed channel with at least one channel section whose wall completely or partially consists of a hydrophobic, gas-permeable membrane, in which the cross-sectional area of the channel decreases continuously or in steps from an inlet opening to an outlet opening and sections of the channel wall not constituted of the membrane are defined by a one-piece machined body.

20 Claims, 6 Drawing Sheets

SEPARATOR FOR DIRECT METHANOL FUEL CELL

CROSS-REFERENCE TO RELATED PATENT APPLICATIONS

This application claims the benefit of European Patent Application No. 07 101 794.1, filed on Feb. 6, 2007 and Korean Patent Application No. 10-2008-0009021, filed on Jan. 29, 2008, the disclosures of which are incorporated by reference in their entireties.

BACKGROUND OF THE INVENTION

1. Field of the Invention

The present disclosure relates to a separator for a direct methanol fuel cell, and more particularly, to a separator for the separation of a gas/liquid mixture for a direct methanol fuel cell.

2. Description of the Related Art

A fuel cell is a galvanic cell converting the chemical reaction energy of continuously fed fuel and oxidant into electric energy. In general, a fuel cell comprises two electrodes separated by a membrane and/or by an electrolyte. The anode is surrounded by a flow of fuel, for example hydrogen, methane, or methanol, and the fuel is oxidized there. The cathode is surrounded by a flow of oxidant, for example oxygen, hydrogen peroxide, or potassium thiocyanate, which is reduced at the cathode. Depending on the type of fuel cell, the materials used to realize the single components are typically selected differently.

A direct methanol fuel cell (DMFC) is a low-temperature fuel cell which is operative in a temperature range as low as about 60-120° C. This type of fuel cell typically utilizes a polymer membrane as electrolyte. Methanol ($CH_3OH$), with no previous reforming, is supplied directly to the anode together with water to be oxidized there. Carbon dioxide ($CO_2$) is formed as waste gas at the anode. Atmospheric oxygen supplied to the cathode as oxidant reacts with $H^+$ ions and electrons to form water. The advantage of the DMFC lies in the use of a liquid, easy-to-store, and very inexpensive source of energy, which can be distributed in plastic cartridges, for example. Moreover, a vastly branched infrastructure for methanol is already existing in many fields, e.g., through the use as an anti-freeze additive in windshield washer fluids for motor vehicles. Depending on the design, this type of fuel cell can provide power ranging from a few mW up to a few hundreds kW. Specifically, DMFCs are suitable for portable use as substitutes and supplements for conventional accumulators in electronic devices. Typical fields of use are in telecommunication and as power supplies of notebook computers.

The oxidation of methanol on the catalyst of the anode proceeds step by step, and several reaction pathways with various intermediate products have been proposed. To maintain high efficiency of the fuel cell, rapid removal of the reaction products from the region around the electrode is desirable. As a result of the temperatures encountered and the underlying chemistry, a liquid/gas mixture of $CO_2$, water, water vapor, and non-reacted methanol is formed. Water and methanol should be recovered from this liquid/gas mixture so as to maintain self-sufficiency of the system for as long as possible, for example, by recycling as fuel. Furthermore, $CO_2$ is desirably removed from the equilibrium, which is done by means of a $CO_2$ separator. The $CO_2$ is removed from this liquid/gas mixture, which is re-fed in the liquid fuel mixture to the anode, after adjusting the methanol concentration of the liquid fuel mixture. Separation of the gases is made by means of a $CO_2$ separator.

Similarly, a liquid/gas mixture is forming at the cathode, comprising non-consumed air, water, and water vapor. To achieve long-lasting self-sufficiency of the system, as much water as possible is typically separated from the air and re-fed into the anode cycle. To this end, a heat exchanger is arranged downstream of the cathode outlet of the fuel cell so as to cool the mixture and achieve condensation of the water vapor.

Arranged downstream of the heat exchanger is an air separator separating the air stream from liquid water so as to re-feed the water into the anode cycle.

Accordingly, the separators are primarily used in water management and to remove $CO_2$ from the equilibrium. Usually, the separators are put into practice in the form of separate units connected with the actual fuel cell via a feed line as is typical for such a liquid/gas mixture. The spatial distance also results in a temperature gradient, and water condenses from the gradually cooling liquid/gas mixture. Typical separators separate the phase mixture of liquid and gaseous or vaporous components, releasing the gaseous and/or vaporous components into the environment.

In a well-known manner, some typical separators used to separate the liquid/gas mixture includes a porous membrane. The inside of the porous membrane faces the liquid/gas mixture, and the outside thereof is in contact with the environment. Furthermore, such membranes are normally coated with and/or formed of hydrophobic materials. Diffusion channels extend from the inside to outside of the membrane, which are dimensioned such that (liquid) water situated on the inside cannot permeate, but gas can diffuse to the outside.

Some separators act to convey the liquid/gas mixture into a cavity adjacent to the gas-permeable membrane. The volume of the cavity and the relative position of the membrane depend on the orientation of the separator during operation and the volumes of liquid/gas mixture to be expected. The volume of the cavity is set in such a way that the liquid/gas mixture at an entry into the cavity can separate into a gaseous phase and a liquid phase over the entire volume of the cavity. The membrane is arranged so as to be adjacent to the top of the cavity, and contacts the gaseous phase during controlled operation. The liquid phase is discharged at the bottom. Sufficient functionality of such separators is maintained only in the correct spatial orientation of the separator. Tilting of the separator from its upright position should not be more than a few degrees at maximum so that the gaseous phase continues to contact the membrane. Precisely for mobile use of fuel cells, however, this circumstance represents a limitation.

US 2002/0192525 A1 discloses a $CO_2$ separator for a DMFC, which operates independently of the separator's spatial orientation. The anodic waste gas of the DMFC enters a channel via an inlet of the separator, and the outlet opening is designed in such a way that pressure is built up as a result of entering waste gas. The channel has porous and hydrophobic walls permeable to $CO_2$. The $CO_2$ separator described can operate independently of its spatial position.

SUMMARY OF THE INVENTION

Embodiments of a gas liquid/separator, useful separating for gas and liquid phases from the exhaust from the cathode and/or anode of a fuel cell, for example, a direct methanol fuel cell (DMFC), comprise an elongate channel with a cross-sectional area that decreases monotonically from an inlet to the channel to an outlet of the channel. At least a portion of a wall of the channel comprises a gas-permeable membrane.

Embodiments of the separator operate effectively despite changes in physical orientation, for example, when rotated, which is useful in portable applications, for example, in portable computers.

Some embodiments provide a separator for the separation of a gas/liquid mixture for a direct methanol fuel cell (DMFC), which operates independently of its spatial position, and which separates air from the cathode water and/or separates $CO_2$ from the anode cycle.

Some embodiments also provide a separator for the separation of a gas/liquid mixture for a direct methanol fuel cell (DMFC), which has a robust and compact structure.

Some embodiments also provide a separator for the separation of a gas/liquid mixture for a direct methanol fuel cell (DMFC), in which the separator has a closed channel with at least one channel section whose wall completely or partially comprises a hydrophobic, gas-permeable membrane, the cross-sectional area of the channel decreases continuously or in steps from an inlet opening to an outlet opening, and the sections of the channel wall comprising the membrane comprise a one-piece, particularly solidly designed machined body. Embodiments of the separator allow separation of liquid/gas mixtures at any spatial orientation of the separator. In particular, embodiments of the separator have a remarkably robust and compact structure, and owing to the selected structure, can be produced on an industrial scale.

Inter alia, we have found that, in some embodiments, passage of a gas/liquid mixture through a tapering channel whose wall—at least in sections—is completely or partially predetermined by the membrane, which allows separation of the gaseous and liquid phases at any orientation of the separator. The gas/liquid mixture enters the channel via an inlet opening. As the channel narrows towards the outlet opening, pressure is built up, which supports separation of the phases. On its way from the intake opening to the outlet opening, the gas/liquid mixture passes the channel sections whose walls comprise the membrane, and it is in these channel sections that the gaseous component of the mixture diffuses through the membrane and to the outside and is carried away. Furthermore, in some embodiments, the gas/liquid mixture undergoes further cooling on its way from the inlet opening to the outlet opening, so that the resulting condensation processes further reduce the proportion of water and methanol in the gaseous phase. With increasing path length, the liquid proportion of the gas/liquid mixture continuously increases in the channel, eventually resulting in pure or largely pure liquid component at the outlet opening. The cross-sectional area of the channel may decrease from the inlet opening to the outlet opening by a ratio ranging from about 2 to about 40.

In some embodiments, the sections of the channel wall comprising the membrane comprises a one-piece, particularly a solidly designed machined, body. In this way, the separator is provided with desired mechanical stability and especially in mobile use, and provision and production of the channel can easily be accomplished on an industrial scale by means of said machined body. In some embodiments, the machined body is solidly designed and can be made, for example, of plastic. The machined body can be made of a thermally conductive material, e.g., a metal or a carbon-based material, in which the good thermal conductivity of such thermally conductive material supports cooling of the separator. The dimensions and geometry of the machined body are adapted to the dimensions of the channel and the space available for the construction of the separator.

Furthermore, the above-mentioned machined body may have an oblong groove on its surface, and the membrane is stretched across the groove so as to form the channel. In other words, the top of the preferably, flat, machined body is contoured, and the channel-like structure is formed by fixing the membrane on said surface.

The above-mentioned groove preferably has a serpentine-like contour. However, the groove can also have other designs such as straight lines or spirals. If the groove has a serpentine-like contour with parallel channel sections spaced apart from each other by bridges, and if the membrane is stretched across the groove and the bridges, the first partial area of the membrane resting over the groove (the channel) is larger than the second partial area of the membrane resting over the bridges in some embodiments. In this way it is possible to achieve a favorable ratio of membrane area available for gas separation to total membrane area.

In a likewise preferred fashion, the membrane is fixed to the surface of the machined body by means of a flat mounting body. In other words, the mounting body makes close contact with the surface of the machined body having the groove therein, thereby forming the channel. The membrane is tightly fixed between the mounting body and machined body. It will be appreciated that the design of the mounting body should be selected such that the gaseous component to be separated from the gas/liquid mixture will still be capable of diffusing through the membrane and can be removed following one or more passages therethrough.

The above-mentioned mounting body preferably has an oblong gap, the position and shape of which are selected in such a way that the gap in fixed condition faces the oblong groove of the machined body. In other words, the gap follows the contour of the underlying channel in this variant.

The mounting body may have a thickness in a range of from about 0.1 mm to about 3 mm. In some embodiments in which the thickness is below the above-mentioned limit, the mechanical support of the membrane by the mounting body may be insufficient, and failures may occur with increasing service time. In some embodiments in which the thickness is above the above-mentioned limit, there is a risk of humidity condensing on the wall of the gap, so that circulation of air on the outside of the membrane would be impeded with increasing service time. In one embodiment that is particularly easy to carry out, both the machined body and mounting body have a flat-cuboid contour, and the membrane is situated between the contoured flat surface of the machined body with the flat surface of the mounting body resting thereon.

Channel dimensioning depends on several factors. On the one hand, it is desirable in some embodiments that the entering gas/liquid mixture is not completely separated into an upper region and a lower region along the total length of the channel sections having the membrane arranged therein. In other words, the channel should be dimensioned such that gaseous and liquid phases would alternate in longitudinal direction at least in those channel sections including the membrane. Thus, for example, the gaseous component of the gas/liquid mixture is present in the channel in the form of gas bubbles that are conveyed towards the outlet opening and extend across the entire cross-sectional area of the channel section wherein they are situated.

On the other hand, such dimensioning depends on the operation parameters of the fuel cell to be installed, that is, on the magnitude of the volumes of gas/liquid mixture to be expected. It will be appreciated that large volumes could also be managed by apportioning the volume flow among a plurality of separators.

In some embodiments, the cross-sectional area of the channel at the inlet opening is preferably least about 1 mm$^2$ so as to limit loss of pressure within the channel. In a preferred embodiment, the cross-sectional area can be about 100 mm$^2$ at maximum at a maximum height of the channel of about 10 mm. What is achieved in this way is that the gas bubbles and liquid regions move through the channel one after the other so that the gas bubbles are in contact with the membrane at any orientation.

Some embodiments of the membrane comprise a gas-permeable hydrophobic material. In particular, the membrane can comprise fluorinated polymers, which can resist the aggressive media of a fuel cell over a long term. For example, some embodiments of the membrane comprise polytetrafluoroethylene (PTFE).

The separator is preferably designed as an air separator of a direct methanol fuel cell (DMFC), for example, for a portable computer (laptop). The total area of the membrane sections available for permeation is preferably in the range of from about 8 $cm^2$ to about 60 $cm^2$. Independently of or supplementary to the preceding preferred embodiment of the air separator, the depth of the channel in the region of the inlet opening is preferably from about 2 mm to about 6 mm. Independently of or supplementary to any of the preceding preferred embodiments of the air separator, the cross-sectional area of the channel at the inlet opening is from about 4 $mm^2$ to about 40 $mm^2$. Independently of or supplementary to any of the preceding preferred embodiments of the air separator, the cross-sectional area of the channel at the outlet opening is from about 0.01 $mm^2$ to about 10 $mm^2$, more preferably from about 0.05 $mm^2$ to about 1 $mm^2$, so as to generate sufficient dynamic pressure and force the air through the membrane, but avoiding overloading of the air compressor present in the system. Finally, independently of or supplementary to any of the preceding preferred embodiments of the air separator, the ratio of the cross-sectional area at the inlet opening to the cross-sectional area at the outlet opening can be in the range of from about 2:1 to about 20:1. In the same way, but using different dimensioning, the principle of an air separator explained in detail herein can also be applied to a $CO_2$ separator of a DMFC for other applications.

Some embodiments provide a separator for separating a gas/liquid mixture, a fuel cell system comprising the separator fluidly connected to a cathode outlet of a direct methanol fuel cell (DMFC), and/or a portable computer comprising a fuel cell system comprising the separator fluidly connected to a cathode outlet of a direct methanol fuel cell (DMFC). Some embodiments of the separator comprise: a hydrophobic, gas-permeable membrane; a one-piece machined body; a closed channel comprising a first end, a second end, and at least one channel section; an inlet opening fluidly connected to the first end of the channel; and an outlet opening fluidly connected to the second end of the channel, wherein a cross-sectional area of the channel decreases monotonically from the first end to the second end of the channel, the at least one channel section is defined by the one-piece machined body and at least a portion of the hydrophobic, gas-permeable membrane.

In some embodiments, a surface of the machined body comprises an elongate groove, and the membrane is disposed over the groove, thereby defining the channel. In some embodiments, the groove comprises a serpentine-like portion. In some embodiments, the serpentine-like portion of the groove comprises a plurality of parallel channel sections spaced apart from each other by bridges, and the membrane is disposed over the groove and the bridges, so that a first area of the membrane disposed over the groove is larger than a second area of the membrane disposed over the bridges.

In some embodiments, the machined body comprises a thermally conductive material.

In some embodiments, the membrane is disposed between the surface of the machined body and a flat mounting body. In some embodiments, the mounting body comprises an elongate gap, dimensioned and shaped to match at least a portion of the corresponding elongate groove of the machined body. In some embodiments, the mounting body is from about 0.1 mm to about 3 mm thick.

In some embodiments, a ratio between a cross-sectional area of the channel at the inlet opening and a cross-sectional area of the channel at the outlet opening is from about 2 to about 40.

In some embodiments, a cross-sectional area of the channel at the inlet opening is at least about 1 $mm^2$. In some embodiments, a cross-sectional area of the channel at the inlet opening is not greater than about 100 $mm^2$, and a height of the channel is not greater than about 10 mm.

In some embodiments, the membrane comprises polytetrafluoroethylene (PTFE).

In some embodiments, the separator is dimensioned and configured as an air separator for a direct methanol fuel cell (DMFC) for a portable computer. In some embodiments, a total area of the portion of the membrane defining the channel is from about 8 $cm^2$ to about 60 $cm^2$. In some embodiments, a depth of the channel at the inlet opening is from about 2 mm to about 6 mm. In some embodiments, a cross-sectional area of the channel at the inlet opening is from 4 $mm^2$ to about 40 $mm^2$. In some embodiments, a cross-sectional area of the channel at the outlet opening is from 0.01 $mm^2$ to about 10 $mm^2$. In some embodiments, a cross-sectional area of the channel at the outlet opening is from about 0.05 $mm^2$ to about 1 $mm^2$. In some embodiments, a ratio between a cross-sectional area of the channel at the inlet opening to a cross-sectional area of the channel at the outlet opening is from about 2:1 to about 20:1.

In some embodiments, the cross-sectional area of the channel decreases continuously from the first end to the second end. In some embodiments, the cross-sectional area of the channel decreases in at least one step from the first end to the second end.

BRIEF DESCRIPTION OF THE DRAWINGS

A more complete appreciation of certain embodiments and many of the attendant advantages thereof, will be readily apparent as the same becomes better understood by reference to the following detailed description in conjunction with the accompanying drawings in which like reference symbols indicate the same or similar components, wherein.

DETAILED DESCRIPTION OF CERTAIN EMBODIMENTS

Certain embodiments will now be described more fully with reference to the accompanying drawings, in which exemplary embodiments of the invention are shown.

Figure 1:
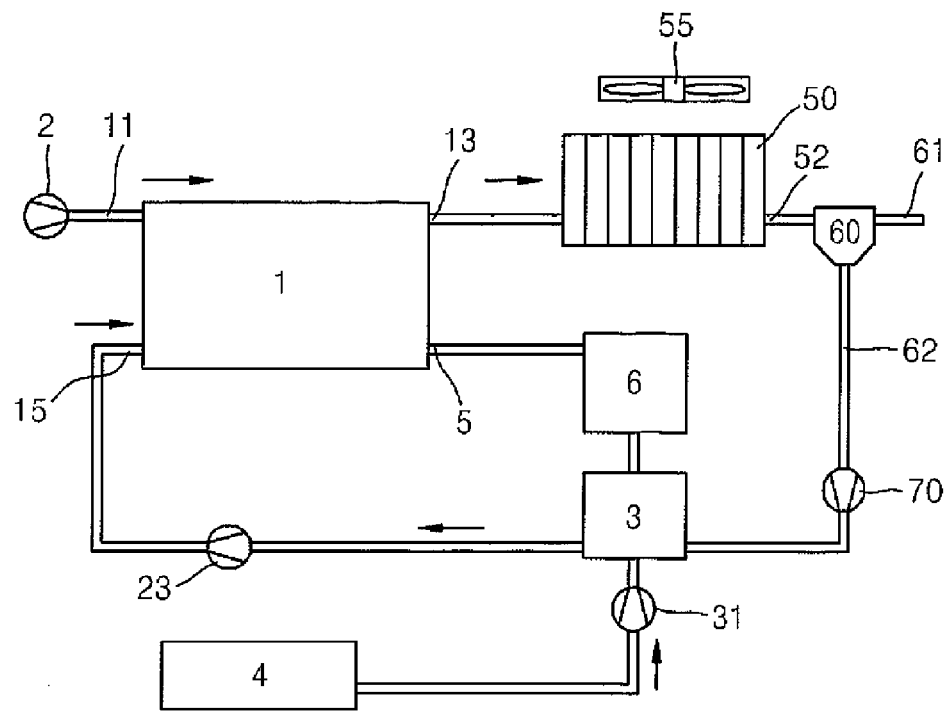
FIG. 1 shows a schematic view of an embodiment of a direct methanol fuel cell (DMFC)

FIG. 1 illustrates a structure of an embodiment of a direct methanol fuel cell (DMFC). The electrochemical process, which need not be explained in detail for the present purpose, proceeds in a fuel cell stack 1. The reaction product at the anode side is a liquid/gas mixture containing $CO_2$ and water.

Using a first pump 2, air is supplied to the fuel cell stack 1 via an inlet opening 11 at the cathode side. The supplied air exits from a cathode-side outlet opening 13 of the fuel cell stack 1 and is cooled by a fan 55 and a heat exchanger 50. The cooled air and liquid condensed therefrom leave the heat exchanger 50 through an outlet opening 52, and enter an air separator 60. The air separator 60 is in connection with an outlet valve 61 via corresponding lines and with a mixer 3 via a line 62, which is connected with a second pump 70 in the illustrated embodiment. At the anode side, the mixture from the mixer 3 is supplied to the fuel cell stack 1 via an inlet opening 15 using a third pump 23. Furthermore, fuel, for example, methanol, is supplied to the mixer 3 via a fuel tank 4 and a corresponding valve 31. Finally, the fuel cell stack 1 has an outlet opening 5 at the anode side, which leads to a $CO_2$ separator 6 via a line. The separator 6 has a membrane that separates the liquid/gas mixture as discussed below.

Figure 2:
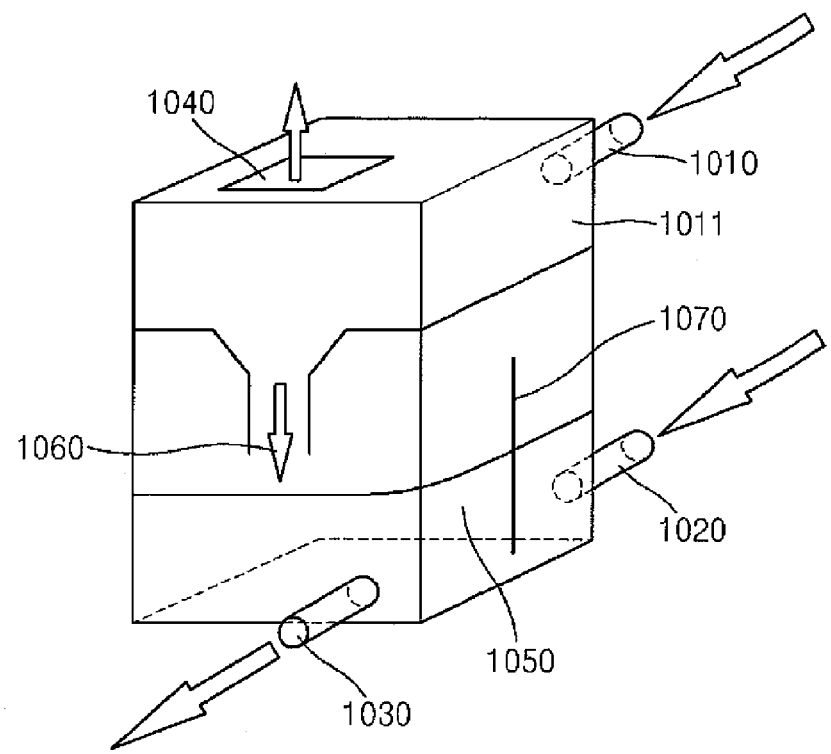
FIG. 2 shows a schematic perspective view of an embodiment of a DMFC separator.

FIG. 2 illustrates a schematic perspective view of a typical DMFC separator. FIG. 2 shows a function of a DMFC separator, which can be an air separator or a $CO_2$ separator. The schematic sectional diagram shows an inlet opening 1010 for a gas/liquid mixture from a fuel cell. After entering a cavity 1011, the supplied gas/liquid mixture separates into its gaseous and liquid components. The gaseous component can be withdrawn via a top outlet opening 1040 at the top, which is normally equipped with a gas-permeable membrane, whereas the liquid component is supplied to a mixer 1050 via a bottom outlet opening 1060 arranged at the bottom of the cavity 1011. A fuel line 1020 used to feed methanol is connected to the mixer, and the resulting mixture is supplied to the fuel cell via a line 1030. The filling level of liquid component in the cavity 1011 can be detected by means of a suitable sensor 1070. Accordingly, the separator outlined merely schematically herein operates according to an easily implemented gravity principle but, as a result, suffers from the drawback that its functionality depends on the spatial orientation of the separator.

Figure 3:
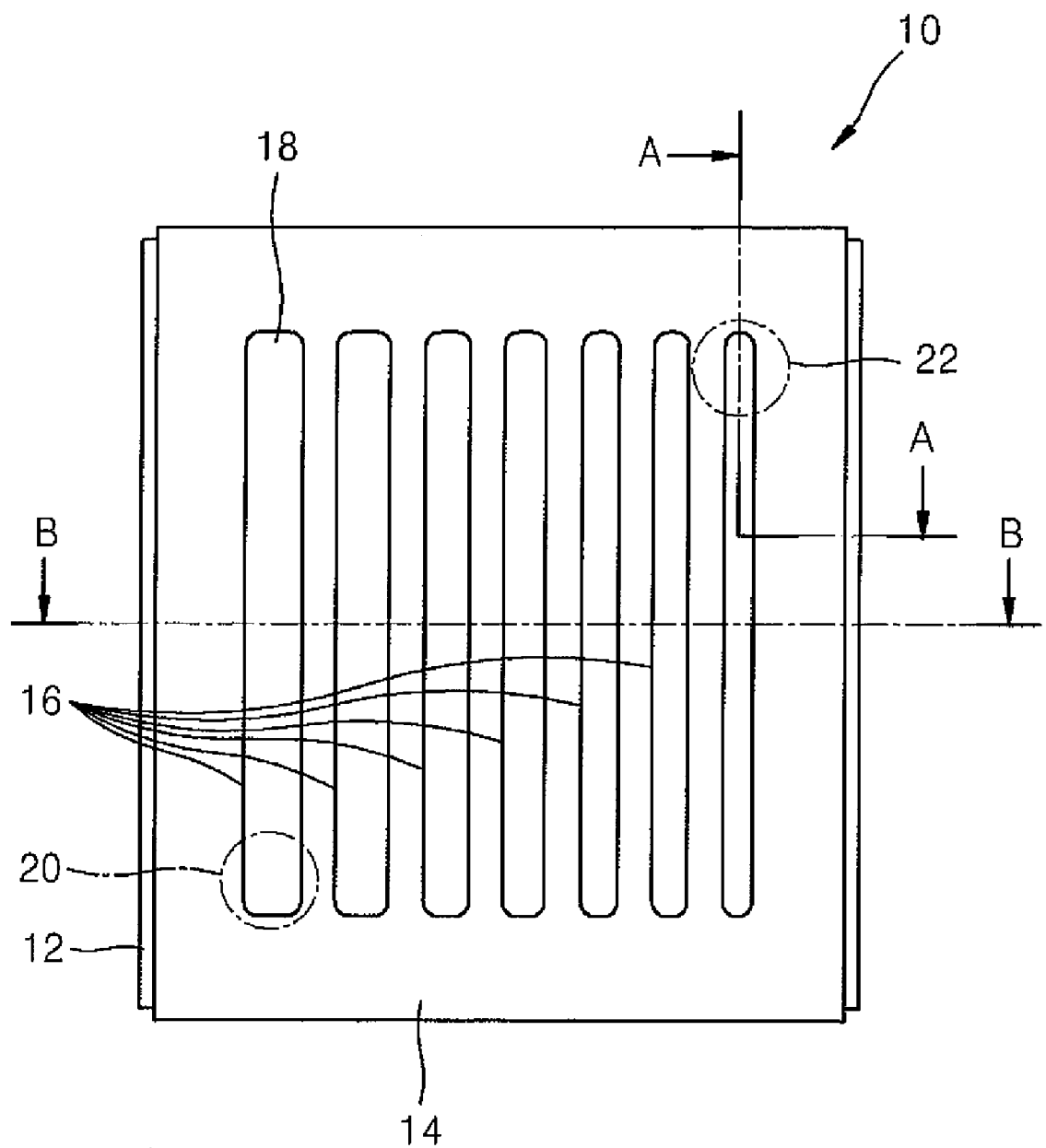
FIG. 3 shows a top view of an embodiment of a DMFC separator.

FIG. 3 shows a top view of an embodiment of a DMFC separator 10, which is useful as an air separator or as a $CO_2$ separator. The schematic illustration merely shows the components of one embodiment. The separator 10 shown in the view in FIG. 3 has a flat contour, and the chosen perspective allows a view on a functional side of the separator 10, from which the gaseous component of the gas/liquid mixture-to-be-separated leaves the separator 10 and is withdrawn.

The separator 10 comprises two components, in which one component is a mounting body 14 disposed, for example, on a solid, one-piece machined body 12. The one-piece machined body 12 may comprise one or more parts, which together, for a substantially single body. Each part may be fabricated by any suitable method, for example, machining, forging, casting, molding, etching, combinations, and the like. The mounting body 14 has a plurality of gaps 16 on the top thereof, which are disposed at about an equal distance from each other in the illustrated embodiment. The widths of the gaps 16 decrease from one side of the mounting body to the other, which is from the left to the right in the illustrated embodiment. The relative positions of the gaps 16 and their functionality will be explained in more detail below.

Situated between the machined body 12 and the mounting body 14 is a membrane 18, which can be seen in the regions exposed by the gaps 16. Accordingly, at least a portion of the gaps 16 extend through the depth of the mounting body 14. The peripheral sides between the machined body 12 and mounting body 14 are sealed in a manner suitable for the gas/liquid mixture to be separated. The areas highlighted by circles illustrate the positions of an inlet opening 20 and an outlet opening 22, explained in more detail below, and of a channel 24 (FIG. 4, not visible in FIG. 3).

Figure 4:
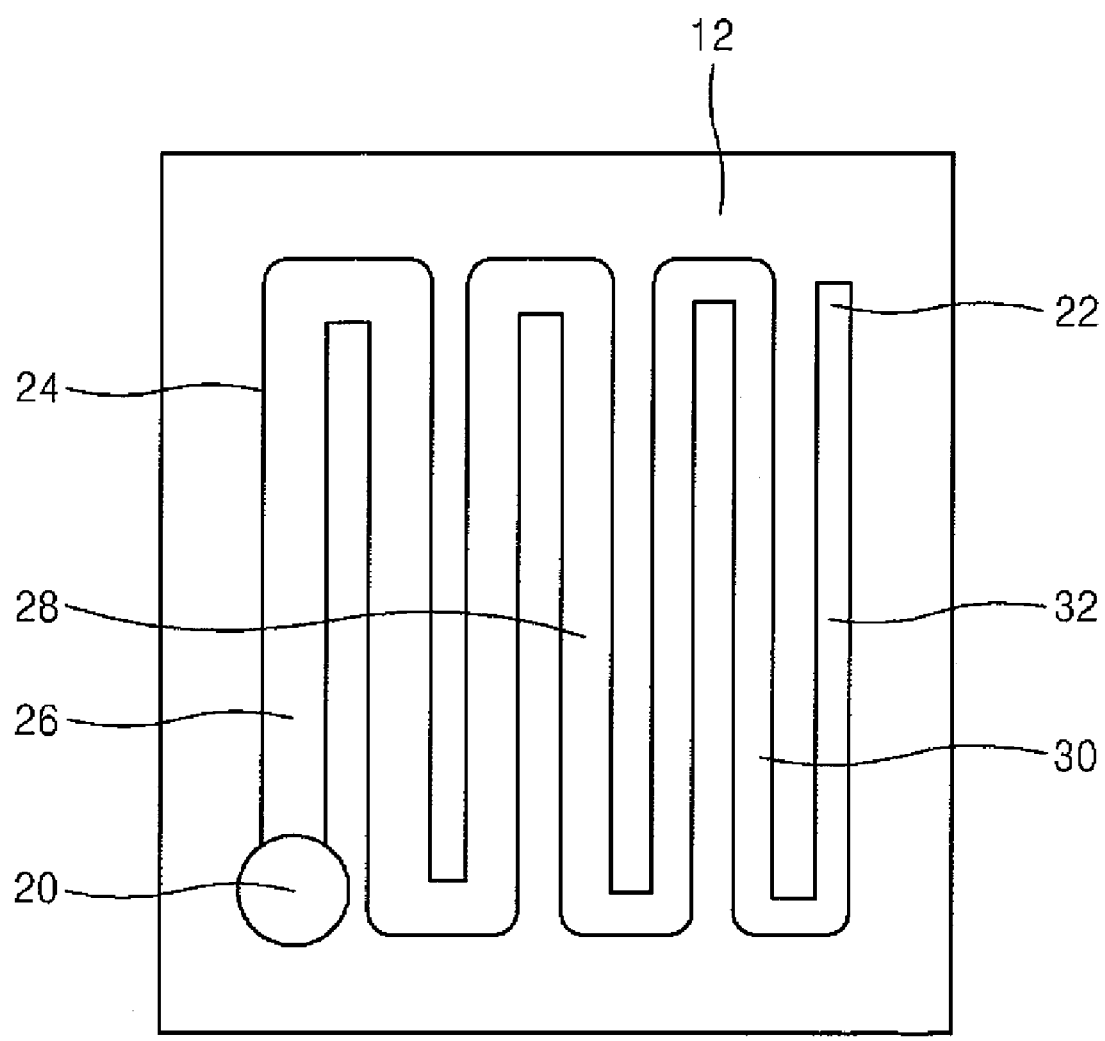
FIG. 4 shows a top view of an embodiment of a machined body useful with the separator of FIG. 3.

FIG. 4 illustrates a top view of the machined body 12 of the separator 10 of FIG. 3. For example, the machined body 12 can comprise stainless steel, and a cooling unit can be mounted on the rear thereof, allowing thermal conditioning of the gas/liquid mixture to be separated. Alternatively, the machined body 12 can be made of a thermally conductive carbon material or of a plastic material allowing easy molding and processing. The top of the machined body 12 has a serpentine-like groove, which together with the membrane 18, forms a channel 24. As can be seen in this example, the dimensions of the channel 24 are essentially determined by the geometry of the groove, for which reason the contour itself will be simply referred to as channel 24.

Referring to FIG. 4, the channel 24 extends in a serpentine-like shape across the surface of the machined body 12 and towards the outlet opening 22. In the illustrated embodiment, the channel 24 tapers from a first end to a second end, in several steps, e.g., in channel sections 26, 28, 30, and 32. Starting from the first channel section 26, the cross-sectional area of the channel 24 continuously decreases in the second channel section 28, the third channel section 30, and the fourth channel section 32. The overall length of the channel 24 is about 300 mm in the illustrated embodiment, although those skilled in the art will understand that different lengths are used in other embodiments.

Figure 5:
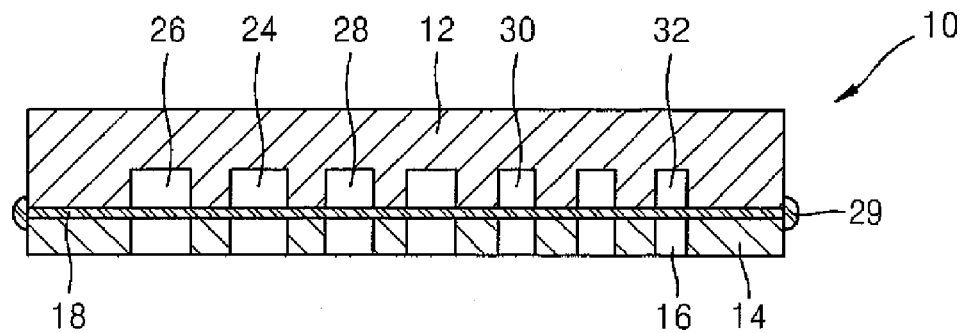
FIG. 5 shows a cross-sectional view of the separator of FIG. 3 taken along section line B-B.

FIG. 5 shows a cross-sectional view of the separator 10 of FIG. 3 taken along section line B-B. As can be seen, the membrane 18 is arranged between the machined body 12 and the mounting body 14. In this way, the channel 24, with its channel sections 26, 28, 30, and 32, is spatially separated from the gaps 16 of the mounting body 14 by the membrane 18. The gaseous components of a gas/liquid mixture in channel 24 can enter the gaps 16 through the membrane 18, to be released to the outside and into the environment from there. A seal (or adhesive seam) 29 prevents lateral leakage of gaseous components or gas/liquid mixture from the separator 10.

In the separator 10 illustrated herein, the mounting body 14 has a thickness of about one millimeter so that the gaps 16 accordingly have a depth of about one millimeter at maximum.

In the illustrated embodiment, the first channel section 26 has a cross-sectional area of about 15 $mm^2$. The cross-sectional area decreases towards the fourth channel section 32 to about 5 $mm^2$. In other words, the cross-sectional area of the channel decreases from the inlet opening 20, which has about the same cross-sectional area as the first channel section 26, to the outlet opening 22, which has about the same cross-sectional area as the fourth channel section 32, by a factor of about 2.

The ratio of the overall area of the wall portion in the first channel section 26 that is defined by the membrane 18 to the overall area of the remaining portion of the wall of channel 24 in said first channel section 26, i.e., the wall portions defined by the machined body 12, is about 1:3. In the fourth channel section 32, this ratio is about 1:4.

Figure 6:
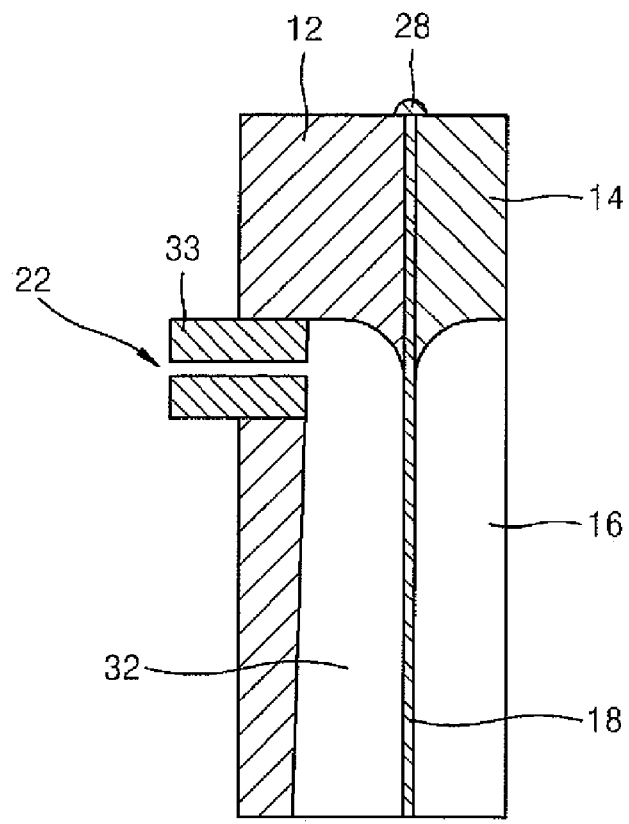
FIG. 6 shows a cross-sectional view of the separator of FIG. 3 taken along section line A-A.

FIG. 6 shows a sectional view of the separator of FIG. 3 taken along line A-A. As can be seen in FIG. 6, the fourth channel section 32 of channel 24 leads to a valve 30 disposed at the rear of the machined body 12. Thus, the cross-sectional area at the outlet opening 22 of valve 33 represents the end point of channel 24 and is about 0.5 mm² (FIG. 6 is merely illustrative and not to scale).

Figure 7:
FIG. 7 shows a schematic top view of an alternative embodiment of a channel of a separator.
Figure 8:
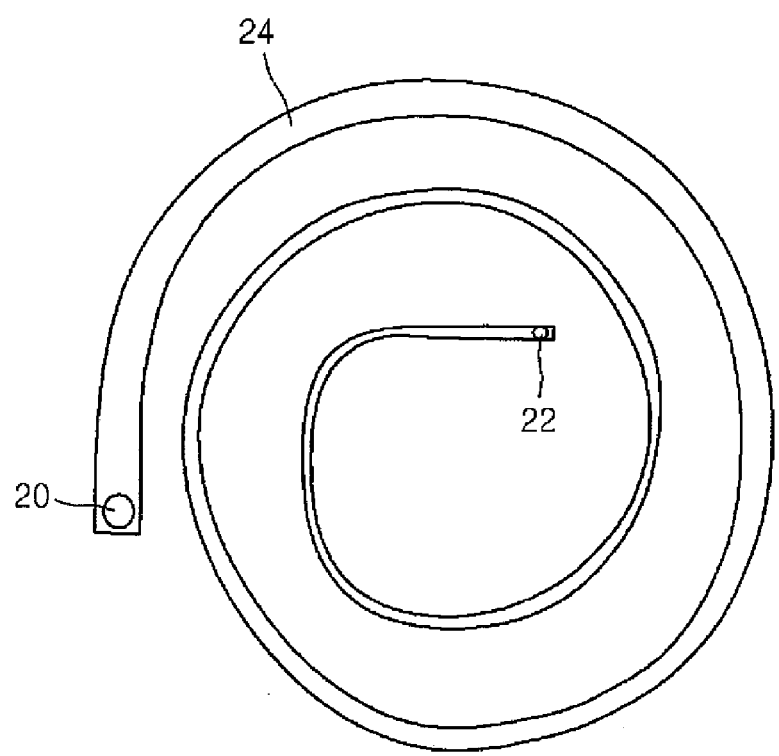
FIG. 8 shows a schematic top view of another alternative embodiment of a channel of a separator.

FIGS. 7 and 8 show top views of two alternative embodiments of the channel 24. The channel 24 illustrated in FIG. 7 has a linear geometry and tapers continuously. The channel 24 illustrated in FIG. 8 shows a spiral shape and tapers continuously.

Figure 9:
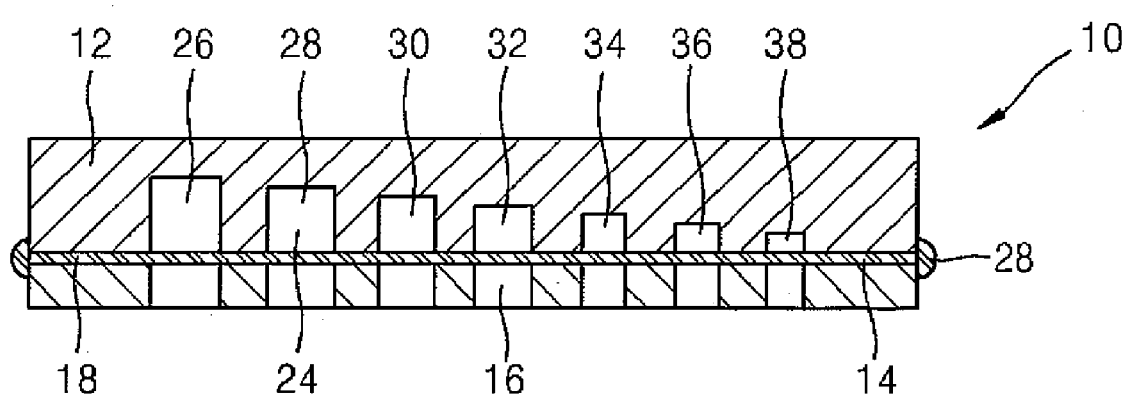
FIG. 9 shows a schematic cross-sectional view of another alternative embodiment of a channel of a separator.

FIG. 9 illustrates a cross-sectional view of another embodiment of the separator. In this case, the height of the channel sections 26, 28, 30, 32, 34, 36, 38 of channel 24 decreases section-by-section from the inlet opening 20 towards the outlet opening 22. Using this embodiment, the reduction of the channel cross-section along the channel 24 can be increased in order to optimize the dynamic pressure conditions, if desired.

In the embodiments illustrated above, the channel sections have substantially rectangular cross sections. In other embodiments, one or more of the channel sections have a different cross section, for example, in which the groove in the machined body has a semicircular, semielliptical, and/or another shape.

Without being bound by any theory, it is believed that as a result of a monotonic, continuous and/or step-by-step, decrease in the cross-sectional area of the channel of the separators according to above embodiments, an overpressure, with respect to the ambient atmospheric pressure, builds up inside the channel during operation. The pressure gradient increases diffusion of the gaseous component through the membrane. Furthermore, the gas/liquid mixture moves from the inlet opening to the outlet opening of the channel, cooling down further during this process. As a consequence, water condenses from the gaseous phase. At the same time, the gaseous component diffuses through the membrane so that the proportion of liquid phase increases with increasing path length, eventually resulting in largely pure or pure liquid component at the outlet opening. As a result of the design and dimensioning of the channel, the gases within the channel will move in the form of bubbles, constantly making contact with the membrane in any geometrical position of the separator, so that all degrees of freedom for the orientation of the separator are available during operation. Separation of the phase mixture is therefore independent of the spatial position of the separator.

While certain embodiments been particularly shown and described with reference to exemplary embodiments, it will be understood by those of ordinary skill in the art that various changes in form and details may be made therein without departing from the spirit and scope of the present disclosure as defined by the following claims.

What is claimed is:

1. A separator for separating a gas/liquid mixture, the separator comprising:
   a one-piece machined body, wherein a surface of the machined body comprises an elongate groove and wherein the elongate groove comprises a serpentine-like portion;
   a hydrophobic, gas-permeable membrane disposed over at least a portion of the elongate groove;
   a closed channel comprising a first end, a second end, and at least one channel section defined by the at least a portion of the elongate groove and at least a portion of the hydrophobic, gas-permeable membrane;
   an inlet opening in fluid communication with the first end of the closed channel; and
   an outlet opening in fluid communication with the second end of the closed channel,
   wherein a cross-sectional area of the channel decreases monotonically from the first end of the closed channel to the second end of the closed channel,
   wherein the hydrophobic, gas permeable membrane is disposed between the surface of the machined body and a mounting body, and
   wherein the mounting body comprises an elongate gap penetrating the mounting body and is dimensioned and shaped to match at least a portion of the corresponding elongate groove of the machined body.

2. The separator of claim 1, wherein the serpentine-like portion of the elongate groove comprises a plurality of parallel channel sections spaced apart from each other by bridges, and the hydrophobic, gas-permeable membrane is disposed over the elongate groove and the bridges such that a first area of the hydrophobic, gas-permeable membrane disposed over the at least a portion of the elongate groove is larger than a second area of the hydrophobic, gas-permeable membrane disposed over the bridges.

3. The separator of claim 1, wherein the machined body comprises a thermally conductive material.

4. The separator of claim 1, wherein the mounting body is from about 0.1 mm to about 3 mm thick.

5. The separator of claim 1, wherein a ratio between a cross-sectional area of the channel at the inlet opening and a cross-sectional area of the channel at the outlet opening is from about 2 to about 40.

6. The separator of claim 1, wherein a cross-sectional area of the channel at the inlet opening is at least about 1 mm².

7. The separator of claim 1, wherein a cross-sectional area of the channel at the inlet opening is not greater than about 100 mm², and a height of the channel is not greater than about 10 mm.

8. The separator of claim 1, wherein the hydrophobic, gas-permeable membrane comprises polytetrafluoroethylene (PTFE).

9. The separator of claim 1, wherein the separator is configured as an air separator for a direct methanol fuel cell (DMFC) for a portable computer.

10. The separator of claim 9, wherein a total area of the portion of the hydrophobic, gas-permeable membrane defining the channel is from about 8 cm² to about 60 cm².

11. The separator of claim 9, wherein a depth of the channel at the inlet opening is from about 2 mm to about 6 mm.

12. The separator of claim 9, wherein a cross-sectional area of the channel at the inlet opening is from 4 mm² to about 40 mm².

13. The separator of claim 9, wherein a cross-sectional area of the channel at the outlet opening is from 0.01 mm² to about 10 mm².

14. The separator of claim 13, wherein a cross-sectional area of the channel at the outlet opening is from about 0.05 mm² to about 1 mm².

15. The separator of claim 9, wherein a ratio between a cross-sectional area of the channel at the inlet opening to a cross-sectional area of the channel at the outlet opening is from about 2:1 to about 20:1.

16. The separator of claim 1, the cross-sectional area of the channel decreases continuously from the first end to the second end.

17. The separator of claim 1, the cross-sectional area of the channel decreases in at least one step from the first end to the second end.

18. The separator of claim 1, wherein a width of the elongate gap decreases from one side of the mounting body to the other side of the mounting body.

19. A fuel cell system for a portable computer comprising the separator of claim 1 in fluid communication with a cathode outlet of a direct methanol fuel cell (DMFC).

20. A portable computer comprising a fuel cell system electrically coupled thereto, the fuel cell system comprising the separator of claim 1 in fluid communication with a cathode outlet of a direct methanol fuel cell (DMFC).

* * * * *